United States Patent
Harshberger

(10) Patent No.: US 9,526,234 B2
(45) Date of Patent: Dec. 27, 2016

(54) BOWFISHING ARROW

(71) Applicant: David R. Harshberger, Nappanee, IN (US)

(72) Inventor: David R. Harshberger, Nappanee, IN (US)

( * ) Notice: Subject to any disclaimer, the term of this patent is extended or adjusted under 35 U.S.C. 154(b) by 22 days.

(21) Appl. No.: 14/577,662

(22) Filed: Dec. 19, 2014

(65) Prior Publication Data

US 2016/0174535 A1 Jun. 23, 2016

(51) Int. Cl.
| | |
|---|---|
| A01K 81/00 | (2006.01) |
| A01K 97/00 | (2006.01) |
| A01K 99/00 | (2006.01) |
| F42B 6/04 | (2006.01) |
| F42B 6/08 | (2006.01) |

(52) U.S. Cl.
CPC .............. *A01K 81/00* (2013.01); *A01K 97/00* (2013.01); *A01K 99/00* (2013.01); *F42B 6/04* (2013.01); *F42B 6/08* (2013.01)

(58) Field of Classification Search
USPC ................... 43/6, 4.5; 473/582, 578–584
See application file for complete search history.

(56) References Cited

U.S. PATENT DOCUMENTS

| | | |
|---|---|---|
| 1,832,727 A | 11/1931 | Nixon |
| 2,212,345 A | 8/1940 | Krieger |
| 2,289,284 A | 7/1942 | Chandler |
| 2,464,048 A * | 3/1949 | Marcus et al. .......... F42B 30/14 102/371 |
| 2,540,387 A | 2/1951 | Butler |
| 2,568,417 A | 9/1951 | Steinbacher |
| 2,599,626 A | 6/1952 | Gottschalk et al. |
| 2,725,656 A | 12/1955 | Schmidt |
| 2,753,643 A | 7/1956 | Recker |
| 2,770,905 A | 11/1956 | Efraimson |
| 2,789,856 A | 4/1957 | Russell |
| 2,806,317 A | 9/1957 | Minisini |
| 2,819,674 A | 1/1958 | Prodanovich |
| 2,820,634 A | 1/1958 | Vance |
| 2,904,338 A | 9/1959 | Podufal |
| 2,937,873 A | 5/1960 | Grissinger |
| 2,939,708 A | 6/1960 | Scheib |
| 2,963,811 A | 12/1960 | Nelson |

(Continued)

FOREIGN PATENT DOCUMENTS

EP 2023073 A1 2/2009

*Primary Examiner* — Christopher P Ellis
(74) *Attorney, Agent, or Firm* — Thomas J. Oppold; Larkin Hoffman Daly & Lindgren, Ltd.

(57) ABSTRACT

A bowfishing arrow and method of bowfishing. The bowfishing arrow includes a shaft having a main stem. A locking pin is slidably movable within a bore of the main stem. A fish point with a pair of pivoting barbs is secured to the distal end of the main stem. An outer sleeve is longitudinally movable with respect to the main stem and the locking pin is engaged with the outer sleeve to move with the outer sleeve. The barbs pivot between a shooting position, a locked position, and an unlocked position. When in the locked position, an end of the locking pin is clamped between cams preventing the barbs from pivoting to toward the unlocked position and the shooting position until the fish is landed. A one-handed maneuver is all that is required to release the arrow from the fish after it is landed.

8 Claims, 4 Drawing Sheets

(56) References Cited

U.S. PATENT DOCUMENTS

| | | | |
|---|---|---|---|
| 2,993,697 A | 7/1961 | Urban | |
| 3,014,305 A | 12/1961 | Yurchich | |
| 3,022,077 A | 2/1962 | Doonan | |
| 3,036,395 A * | 5/1962 | Nelson | F42B 30/14 43/6 |
| 3,036,396 A | 5/1962 | Swails | |
| 3,064,977 A | 11/1962 | Zwickey | |
| 3,138,383 A * | 6/1964 | McKinzie | F42B 6/08 43/6 |
| 3,164,385 A | 1/1965 | Shure | |
| 3,168,313 A | 2/1965 | Lint | |
| 3,578,328 A | 5/1971 | Rickey | |
| 3,600,835 A * | 8/1971 | Hendricks | A01K 81/04 30/159 |
| 3,738,657 A | 6/1973 | Cox | |
| 3,756,600 A | 9/1973 | Maleski | |
| 3,878,788 A | 4/1975 | Ah Sam | |
| 4,024,665 A * | 5/1977 | Payne | A01K 81/00 294/127 |
| 4,099,720 A | 7/1978 | Zeren | |
| 4,166,619 A | 9/1979 | Bergmann et al. | |
| 4,579,348 A | 4/1986 | Jones | |
| 4,615,529 A | 10/1986 | Vocal | |
| 4,642,929 A | 2/1987 | Franklin | |
| 4,685,239 A | 8/1987 | LaMonica | |
| 4,742,637 A | 5/1988 | Musacchia | |
| 4,807,382 A | 2/1989 | Albrecht | |
| 4,819,360 A | 4/1989 | Thomas | |
| 4,901,467 A | 2/1990 | Stolpe | |
| 4,924,619 A | 5/1990 | Dowell | |
| 4,932,671 A | 6/1990 | Anderson, Jr. | |
| 4,940,246 A | 7/1990 | Stagg | |
| 4,973,060 A | 11/1990 | Herzig | |
| 4,976,443 A | 12/1990 | DeLucia | |
| 4,982,523 A * | 1/1991 | Garton | A01K 81/04 43/6 |
| 4,998,738 A | 3/1991 | Puckett | |
| 5,033,220 A | 7/1991 | Phelps | |
| 5,046,744 A | 9/1991 | Eddy | |
| 5,066,021 A | 11/1991 | DeLucia | |
| 5,078,407 A | 1/1992 | Carlston et al. | |
| 5,082,292 A | 1/1992 | Puckett et al. | |
| 5,083,798 A | 1/1992 | Massey | |
| 5,090,709 A | 2/1992 | Johnson | |
| 5,100,143 A | 3/1992 | Puckett | |
| 5,102,147 A | 4/1992 | Szeluga | |
| 5,112,063 A | 5/1992 | Puckett | |
| 5,172,916 A | 12/1992 | Puckett | |
| 5,178,398 A | 1/1993 | Eddy | |
| 5,286,035 A | 2/1994 | Ward | |
| 5,322,297 A | 6/1994 | Smith | |
| 5,458,341 A | 10/1995 | Forrest et al. | |
| 5,472,213 A | 12/1995 | Dudley | |
| 5,564,713 A | 10/1996 | Mizek et al. | |
| 5,570,530 A * | 11/1996 | Lee | A01K 81/00 43/1 |
| 5,803,845 A | 9/1998 | Anderson | |
| 5,820,498 A | 10/1998 | Maleski | |
| 5,857,930 A | 1/1999 | Troncoso | |
| 5,879,252 A | 3/1999 | Johnson | |
| 5,941,784 A | 8/1999 | Mizek | |
| 6,165,086 A | 12/2000 | Liechty, II | |
| 6,171,206 B1 | 1/2001 | Liechty, II | |
| 6,200,237 B1 | 3/2001 | Barrie | |
| 6,258,000 B1 * | 7/2001 | Liechty, II | F42B 6/08 473/583 |
| 6,270,435 B1 | 8/2001 | Sodaro | |
| 6,287,223 B1 | 9/2001 | Liechty, II | |
| 6,287,224 B1 | 9/2001 | Liechty, II | |
| 6,322,464 B1 | 11/2001 | Sestak | |
| 6,398,676 B1 | 6/2002 | Mizek | |
| 6,517,454 B2 | 2/2003 | Barrie et al. | |
| 6,554,727 B1 | 4/2003 | Armstrong et al. | |
| 6,595,881 B1 | 7/2003 | Grace, Jr. et al. | |
| 6,626,776 B2 | 9/2003 | Barrie et al. | |
| 6,669,586 B2 | 12/2003 | Barrie et al. | |
| 6,755,758 B2 | 6/2004 | Liechty, II | |
| 6,758,774 B2 | 7/2004 | Liechty, II | |
| 6,793,596 B1 | 9/2004 | Sullivan et al. | |
| 6,811,503 B2 | 11/2004 | May et al. | |
| 6,830,523 B1 | 12/2004 | Kuhn | |
| 6,910,979 B2 | 6/2005 | Barrie et al. | |
| 6,935,976 B1 | 8/2005 | Grace, Jr. et al. | |
| 7,226,375 B1 | 6/2007 | Sanford | |
| 7,311,621 B2 * | 12/2007 | Sullivan | F42B 6/08 473/583 |
| 7,485,056 B2 | 2/2009 | Sullivan et al. | |
| 7,571,564 B2 * | 8/2009 | Sullivan | F42B 6/08 43/6 |
| 7,677,995 B1 | 3/2010 | Sanford | |
| 7,713,151 B2 | 5/2010 | Fulton | |
| 7,713,152 B1 | 5/2010 | Tentler et al. | |
| 7,717,814 B1 | 5/2010 | Sanford | |
| 7,771,298 B2 | 8/2010 | Pulkrabek | |
| 7,780,554 B1 | 8/2010 | Sanford | |
| 7,905,802 B2 | 3/2011 | Erhard | |
| 7,951,024 B2 | 5/2011 | Mizek | |
| 8,007,382 B1 | 8/2011 | Sanford | |
| 8,016,704 B1 | 9/2011 | Vandewater | |
| 8,043,177 B2 | 10/2011 | Flanagan | |
| 8,062,155 B2 * | 11/2011 | Butcher | F42B 6/08 473/578 |
| 8,105,187 B1 | 1/2012 | Sanford | |
| 8,118,694 B1 | 2/2012 | Oliveira | |
| 8,128,521 B1 | 3/2012 | Ulmer | |
| 8,133,138 B1 | 3/2012 | Hannah | |
| 8,147,361 B1 | 4/2012 | Weaver | |
| 8,157,679 B2 | 4/2012 | Cyr et al. | |
| 8,182,378 B1 | 5/2012 | Futtere | |
| 8,197,367 B2 | 6/2012 | Pulkrabek et al. | |
| 8,287,407 B1 | 10/2012 | Sanford | |
| 8,393,983 B1 | 3/2013 | Sanford | |
| 8,398,510 B1 | 3/2013 | Mizek et al. | |
| RE44,144 E | 4/2013 | Barrie et al. | |
| 8,449,415 B2 | 5/2013 | Grace | |
| 8,449,416 B2 | 5/2013 | Grace et al. | |
| 8,469,842 B2 | 6/2013 | Mizek et al. | |
| 8,469,843 B2 | 6/2013 | Mizek et al. | |
| 8,512,179 B2 | 8/2013 | Pulkrabek et al. | |
| 8,529,385 B1 | 9/2013 | Lee | |
| 8,684,869 B1 | 4/2014 | Perry | |
| 9,146,085 B1 * | 9/2015 | Braun | F42B 6/08 |

* cited by examiner

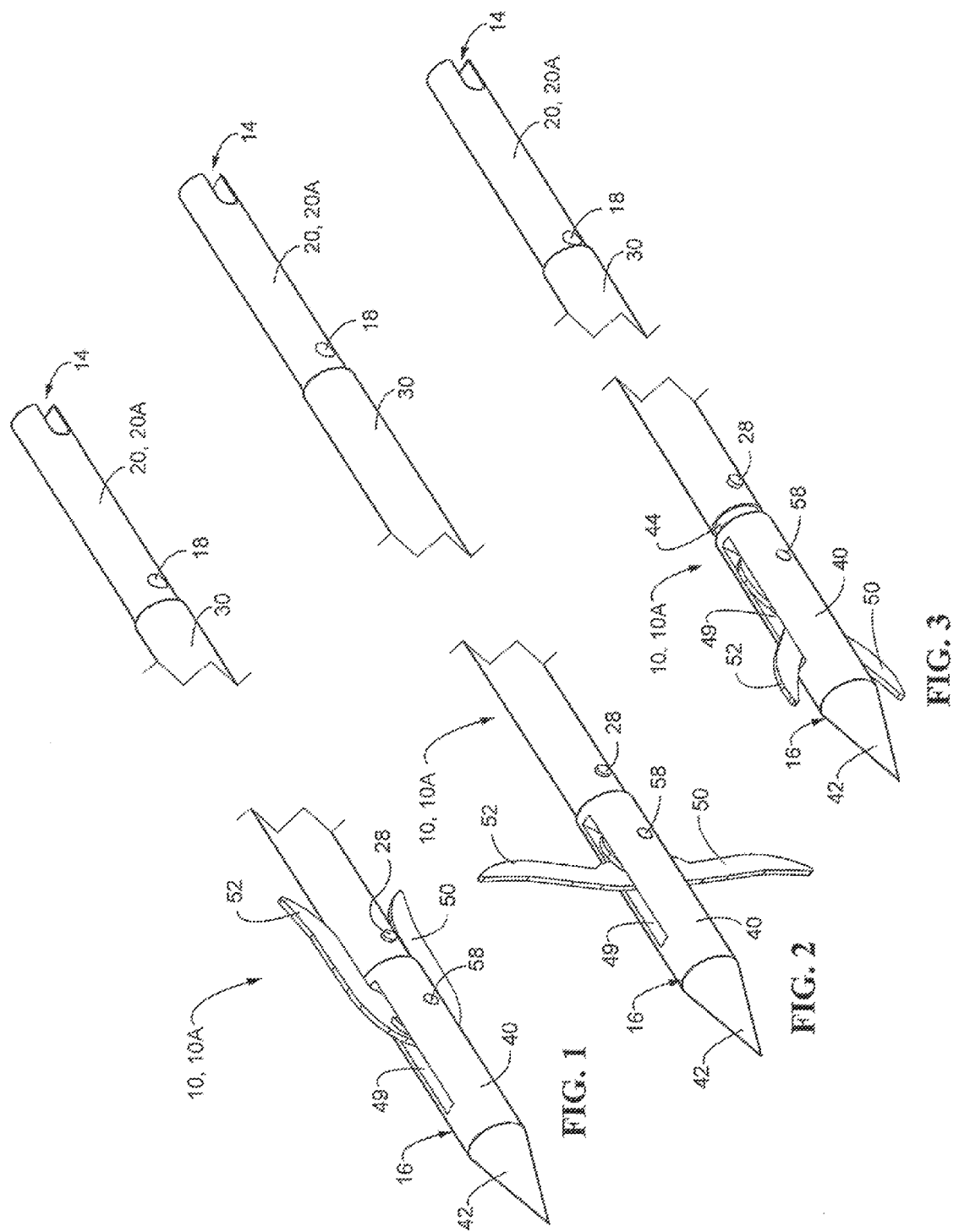

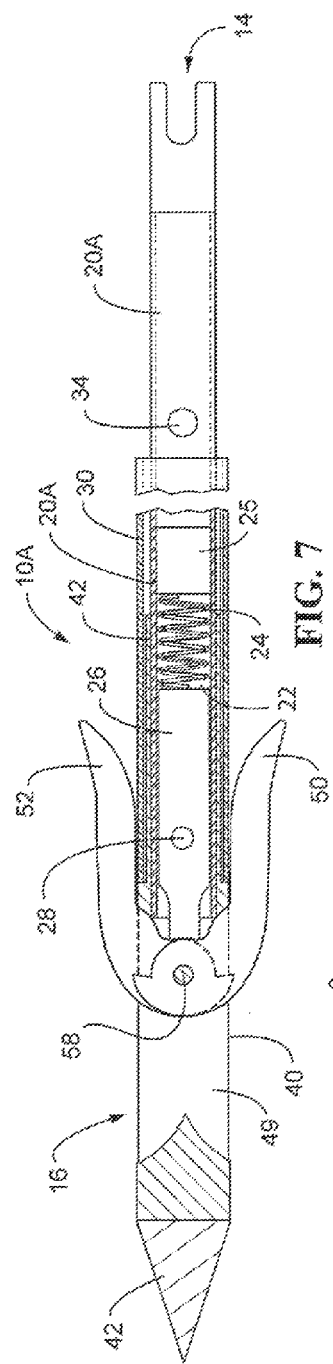
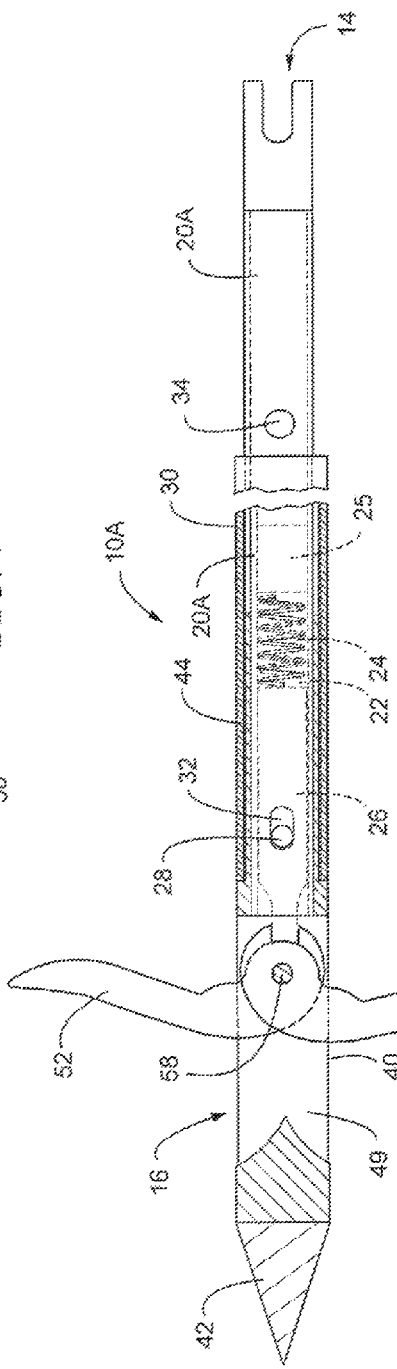
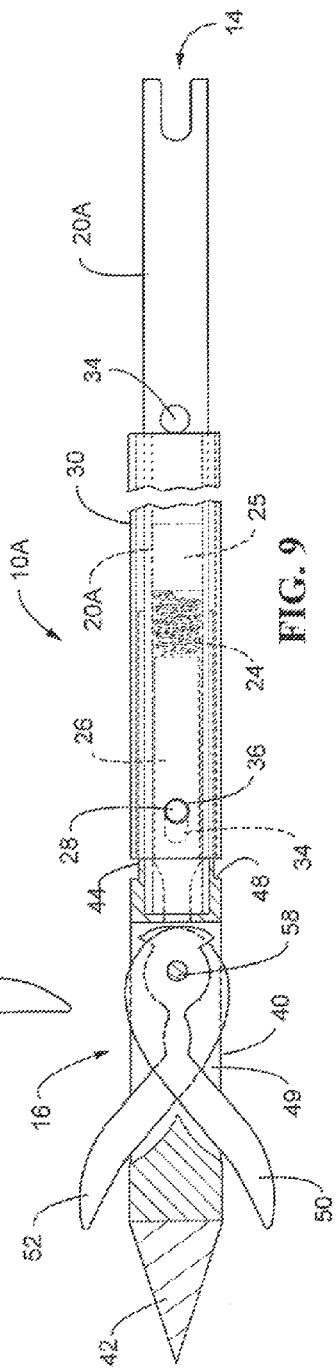

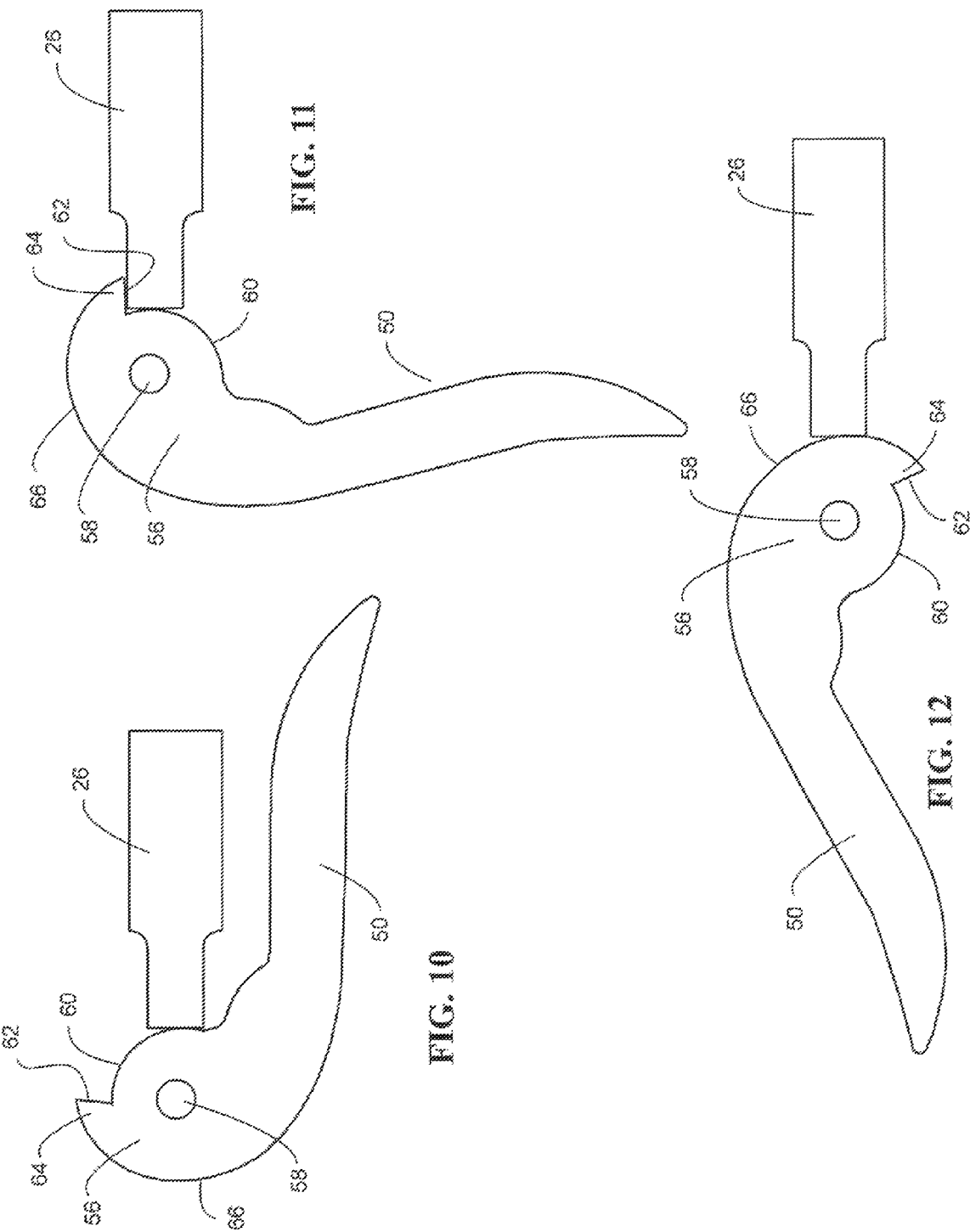

BOWFISHING ARROW

BACKGROUND

Bowfishing is a method of fishing that uses a specialized arrow having a string tethered to the arrow and to a reel mounted on the bow. The string is used to pull or reel in the fish after it is struck by the arrow so the fish can be retrieved or landed. Bowfishing arrows use a "fish point" with barbs that diverge outwardly and rearwardly to the hold or grip the fish and prevent it from coming off the arrow as it is being pulled or reeled in.

Once the fish is landed, the arrow must be removed from the fish. It should be appreciated that pulling the arrow back through the fish with the barbs extended would be difficult and it would tear and mutilate the flesh of the fish in the process. Accordingly, depending on the type of fish point being used, the barbs either need to be reversed or collapsed or the fish point must be removed from the end of the arrow so the arrow can be pulled back through the fish. Thus, if the arrow does not penetrate all the way through the fish when it is shot, conventional fish points require the bowfisherman to force the arrow all the way through the body of the fish so the fish point projects through the side of the fish in order to reverse or collapse the barbs or to remove the fish point from the end of arrow. Attempting to force the arrow through the fish and then attempting to remove the fish point or attempting to reverse or collapse the barbs while a fish is struggling is difficult and typically requires the bowfisherman to set down his bow so he can use both hands. It is also time consuming and can result in injury to the bowfisherman.

Accordingly, there is a need for an improved bowfishing arrow which solidly holds the fish until it is landed, but which also allows the arrow to be quickly and easily removed from the fish after it is landed, does not require the fish point to be forced through the fish in order to collapse or reverse the barbs, and which can be accomplished using only one hand so the bowfisherman does not need to set down the bow to remove the arrow from the fish.

BRIEF DESCRIPTION OF THE DRAWINGS

FIG. 1 is a perspective view of an embodiment of the bowfishing arrow in the shooting position.

FIG. 2 is a perspective view of the bowfishing arrow of FIG. 1 in the locked position.

FIG. 3 is a perspective view of the bowfishing arrow of FIG. 1 in the unlocked position.

FIG. 7 is a partial cross-sectional view of another embodiment of a bowfishing arrow when in the shooting position.

FIG. 8 is a partial cross-sectional view of the bowfishing arrow of FIG. 7 when in the locked position.

FIG. 9 is a partial cross-sectional view of the bowfishing arrow of FIG. 7 when in the unlocked position.

FIG. 10 is an enlarged view of one embodiment of the barbs cooperating with a locking pin and showing the barb in the shooting position.

FIG. 11 is an enlarged view of the barb and locking pin of FIG. 10 and showing the barb in the locked position.

FIG. 12 is an enlarged view of the barb and locking pin of FIG. 10 and showing the barb reversed and in the unlocked position.

DESCRIPTION

Figure 4:
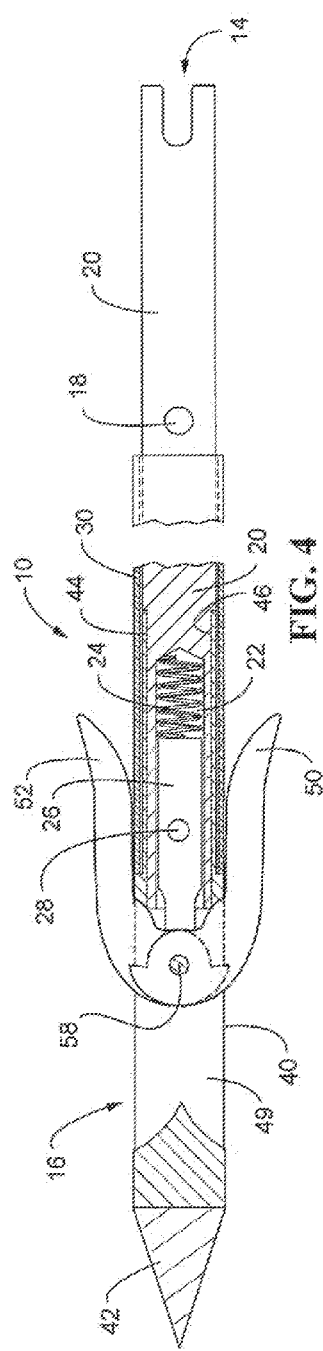
FIG. 4 is a partial cross-sectional view of an embodiment of a bowfishing arrow when in the shooting position.

Referring to the drawings wherein like reference numerals indicate the same or corresponding parts throughout the several views, FIG. 1 illustrates one embodiment of a bowfishing arrow 10. The arrow 10 is comprised of a shaft 12 having nock 14 at a proximal end a fish point 16 at its distal end. An aperture 18 is located near the nock 14 for tethering the string (not show) to the arrow 10. It should be appreciate that the aperture 18 may be sized to receive a stop screw (not shown) for the Safety Slide® system available from AMS LLC, 1064 Hemlock Lane, Stratford, Wis. 54484, as well known to those of skill in the art.

Figure 5:
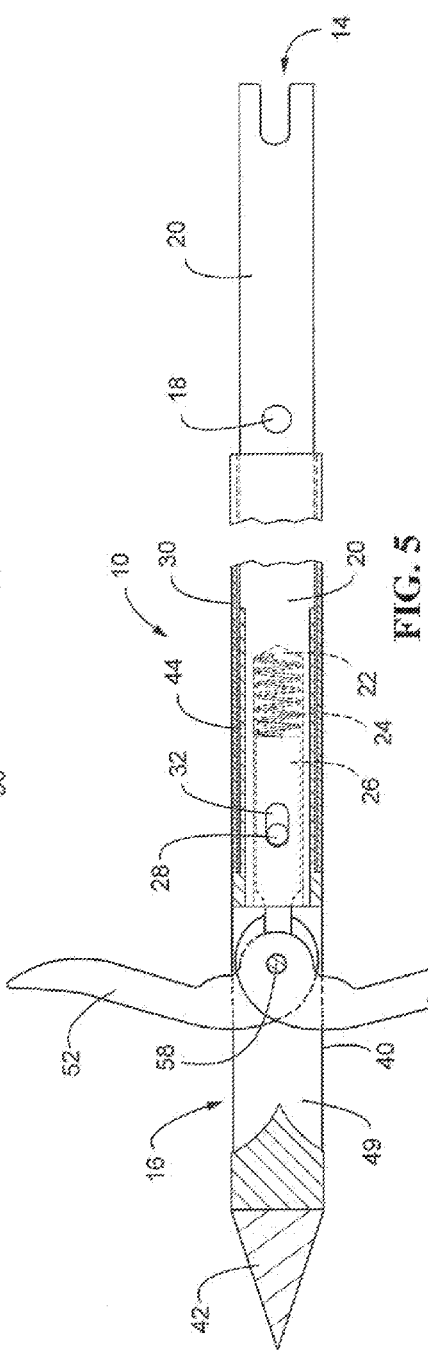
FIG. 5 is a partial cross-sectional view of the bowfishing arrow of FIG. 4 when in the locked position.
Figure 6:
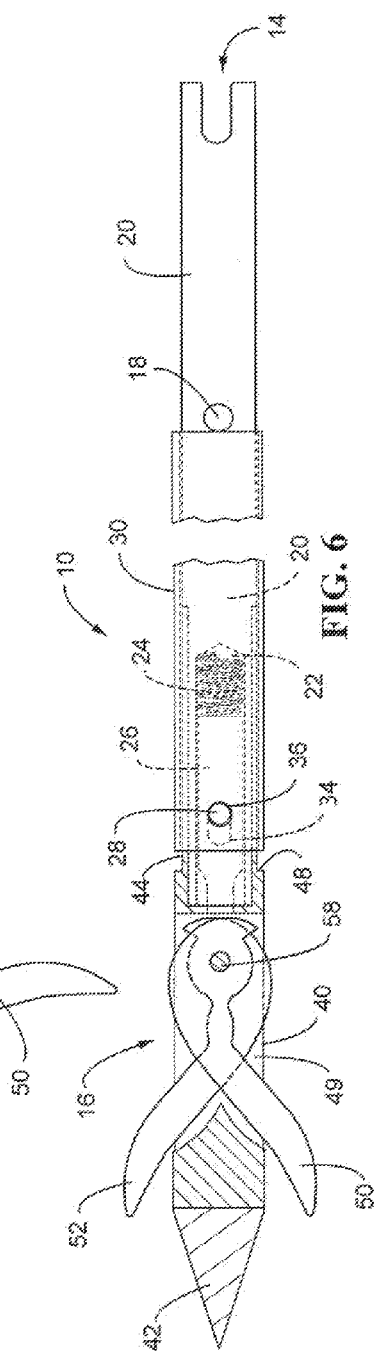
FIG. 6 is a partial cross-sectional view of the bowfishing arrow of FIG. 4 when in the unlocked position.

The shaft 12 is comprised of a main stem 20 with an outer sleeve 30 which is movable with respect to the main stem 20. In one embodiment as shown in FIGS. 4-6, the main stem 20 may be a conventional solid shaft arrow as is typically used for bowfishing which is typically made of fiberglass or carbon, but other suitable materials, such as wood, aluminum or other materials may also be used. A solid core main stem 20 may be desirable for the added weight and stiffness provided by solid core shafts to minimize planing of the arrow when it enters the water and for more hitting power to punch through the scales or tough flesh of the fish.

In the embodiment of FIGS. 4-6, the distal end of the main stem 20 has a central bore 22. The central bore 22 receives a coil spring 24 and a slidable locking pin 26. An alignment peg 28 projects outwardly from the locking pin 26 and through an oblong opening 32 near the distal end of the main stem 20 and a mating oblong opening 34 in the rearward shank 44 of the fish point 16 such that the slidable locking pin 26 is moveable with respect to the main stem 20 and fish point 16 as described in more detail later.

The outer sleeve 30 has a length that extends over the main stem 20 from the end of the fish point 16 toward the nock 14, but terminates a short distance before the aperture 18 near the nock 14 on the main stem 20, such that the outer sleeve 30 is capable of moving longitudinally with respect to the main stem 20. An aperture 36 is provided in the outer sleeve 30 to receive the alignment peg 28 projecting from the locking pin 26 and extending through the oblong apertures 32, 34 in the main stem 20 and rearward shank 44. It should be appreciated that when the outer sleeve 30 is moved longitudinally with respect to the main stem 20, the alignment peg 28 projecting through the aperture 36 causes the locking pin 26 to move with the outer sleeve 30 such that the alignment peg moves longitudinally within the bore 22 of the main stem 20, the purpose for which will be described in more detail later.

The fish point 16 includes a cylindrical body 40 with a conical tip 42 and a rearward shank 44. The conical tip 42 may be integral with the cylindrical body 40 or the conical tip 42 and cylindrical body 40 may have mating internal and external threads such that the tip 42 is threadably removable and replaceable as is well known to those of skill in the art.

The rearward shank 44 has a central bore 46 sized to receive the distal end of the main stem 20 which is securely fixed therein. It should be appreciated that a length of the distal end of the main stem 20 which is inserted into the central bore 46 may have a stepped-down outer diameter, so that when the distal end of the main stem 20 is fully inserted into the central bore 46, the outer diameter of the main stem 20 and the outer diameter of the rearward shank 44 are flush, providing a smooth transition between rearward shank 44 and the main stem 20. However, it is not necessary for the main stem 20 to have a stepped-down outer diameter because a slight step at their transition will not affect sliding of the outer sleeve 30, since the transition between the end of the rearward shank 44 and the main stem 20 is sufficiently rearward of the end of the outer sleeve that there is no chance for the outer sleeve to catch on the slight stepped transition even when the outer sleeve 30 is moved to its most rearward position.

The cylindrical body 40 has an outer diameter substantially the same as the outer diameter of the outer sleeve 30. Thus, the transition from the larger diameter cylindrical body 40 to the smaller diameter rearward shank 44 results in a shoulder 48 (see FIG. 6). The shoulder 48 has a height substantially the same as the thickness of the wall of the outer sleeve 30. Thus, when the distal end of the outer sleeve abuts the shoulder 48, the outer diameters of the cylindrical body 40 and the outer sleeve are flush creating a smooth transition from the fish point 16 to the outer sleeve 30 as the arrow penetrates the fish.

A slot 49 extends through the cylindrical body 40 to pivotally receive opposing barbs 50, 52 which pivot about pivot pin 54 extending through the cylindrical body 40 as illustrated in FIGS. 4-6. FIG. 4 shows the barbs 50, 52 in the shooting position. FIG. 5 shows the barbs 50, 52 in the locked position. FIG. 6 shows the barbs 50, 52 in the unlocked position.

FIGS. 7-9 illustrate an alternative embodiment of the arrow 10A which utilizes a hollow shaft for the main stem 20A. Hollow shaft arrows are well known in the art and are typically made of aluminum or carbon but may be made of any other suitable materials. In this embodiment, the construction of the arrow 10A is substantially the same as previously described, except it should be appreciated that because the main stem 20A is hollow, the central bore 22 for receiving the spring 24 and locking pin 26 is provided by inserting a plug 25 to serve as the backstop for the coil spring 24 and the locking pin 26. Thus, as in the previous embodiment, the alignment peg 28 projects outwardly from the locking pin 26 and through an oblong opening 32 near the distal end of the main stem 20A and a mating oblong opening 34 in the rearward shank 44 of the fish point 16 such that the slidable locking pin 26 is moveable with respect to the main stem 20 and fish point 16 as described in more detail later.

The outer sleeve 30 has a length that extends over the main stem 20A from the end of the fish point 16 toward the nock 14, but terminates a short distance before the aperture 18 near the nock 14 on the main stem 20A, such that the outer sleeve 30 is capable of moving longitudinally with respect to the main stem 20A. An aperture 36 is provided in the outer sleeve 30 to receive the alignment peg 28 projecting from the locking pin 26 and extending through the oblong apertures 32, 34 in the main stem 20A and rearward shank 44. It should be appreciated that when the outer sleeve 30 is moved longitudinally with respect to the main stem 20A, the alignment peg 28 projecting through the aperture 36 causes the locking pin 26 to move with the outer sleeve 30 such that the alignment peg moves longitudinally within the bore 22 of the main stem 20A, the purpose for which will be described in more detail later.

In the embodiment of FIGS. 7-9, the fish point 16 is the same as described in connection with the previous embodiment. The distal end of the main stem 20A is received within the rearward shank 44 as previously described. The distal end of the main stem 20A may have a stepped-down length as previously described for insertion into the central bore 46 or the entire length of the main stem 20A may have the same diameter resulting in a slight step between the transition of the rearward shank 44 to the main stem 20A. As previously described, a slight step at the transition of these two components will not affect sliding of the outer sleeve 30, since the transition between the end of the rearward shank 44 and the main stem 20 is sufficiently rearward of the end of the outer sleeve that there is no chance for the outer sleeve to catch on the slight stepped transition even when the outer sleeve 30 is moved to its most rearward position.

Also as in the previous embodiment, the cylindrical body 40 has an outer diameter substantially the same as the outer diameter of the outer sleeve 30. Thus, the transition from the larger diameter cylindrical body 40 to the smaller diameter rearward shank 44 results in a shoulder 48 (see FIG. 6). The shoulder 48 has a height substantially the same as the thickness of the wall of the outer sleeve 30. Thus, when the distal end of the outer sleeve abuts the shoulder 48, the outer diameters of the cylindrical body 40 and the outer sleeve are flush creating a smooth transition from the fish point 16 to the outer sleeve 30 as the arrow penetrates the fish.

Also as in the previous embodiment, a slot 49 extends through the cylindrical body 40 to pivotally receive opposing barbs 50, 52 which pivot about pivot pin 54 extending through the cylindrical body 40 as illustrated in FIGS. 7-9. FIG. 7 shows the barbs 50, 52 in the shooting position. FIG. 8 shows the barbs 50, 52 in the locked position. FIG. 9 shows the barbs 50, 52 in the unlocked position.

For clarity, FIGS. 10-12 show an enlarged view of only one of the barbs 50 as it cooperates with the locking pin 26, in each of the respective shooting, locked and unlocked positions applicable in both embodiments described above. It should be appreciated that opposing barb 52 has the same configuration as the barb 50 and cooperates with the locking pin 26 in the same way, except it would be a mirror image to the cam 50 shown in FIGS. 10-12. The barb 50 includes an eccentric lobe 56 with a central aperture 58 through which the pivot pin 54 extends and about which the barb 50 pivots. The eccentric lobe 56 has a small radius edge surface 60, an abrupt edge surface 62 which defines a cam 64 and a large radius surface 66.

In use, the barbs 50, 52 are moved to the shooting position as shown in FIGS. 1, 4 and 10 or as shown in FIGS. 1, 7 and 10, depending on the embodiment. When in the shooting position, the locking pin 26 engages the small radius edge 60 of the lobe 56, loosely holding the barbs in the shooting position due to the bias of the coil spring 24. When shot, the arrow 10 will typically penetrate all the way through the body of the fish such that the fish point 16 will be located on the opposite side of the fish's body. Once the bowfisherman begins to pull on the string tethered to the arrow, the fish will begin to slide down the shaft 12 toward the barbs 50, 52. Once the fish's body makes contact with the barbs 50, 52, the barbs are forced outwardly to the locked position as shown in FIGS. 2, 5, and 11 or FIGS. 2, 8 and 11 depending on the embodiment, clamping the locking pin 26 between the cams 64. It should be appreciated that even if the arrow does not penetrate through the fish, the resistance from the flesh of the fish as the arrow is being pulled by the string will cause the barbs to be forced outwardly to the locked position and clamping the locking pin 26 between the cams 64.

As best illustrated in FIG. 11, it should be appreciated that the cam 64 prevents the barbs 50, 52 from further rotating outwardly because the abrupt edge 62 abuts the spring biased locking pin 26. Likewise, the body of the fish pressing against the barbs 50, 52 prevents the barbs from rotating back toward the shooting position. Thus, the barbs 50, 52 will remain in the locked position until the fish is landed and it is desired to remove the arrow from the landed fish.

To remove the arrow from the fish, a simple one-handed maneuver is all that is required as explained step-by-step below. The bowfisherman simply grabs the outer sleeve 30 of the arrow with one hand to lift the fish above the ground a short distance. By gripping only the outer sleeve 30, the entire weight of the fish is carried by the barbs 50, 52 of the fish point 16 which binds the locking pin 26 between the cams 64. While continuing to grip only the outer sleeve 30, the bowfisherman than gives a single quick and forceful downward thrust on the arrow, immediately followed by an upward thrust. This action generates a momentum that multiplies the force or weight of the fish acting on the barbs 50, 52. When the fish's added weight (due to the momentum) hits the locked barbs, it is sufficient to overcome the clamping force of the cams 64 acting on the locking pin 26 permitting the locking pin to move upwardly within the bore 22 compressing the spring 24. As the locking pin 26 moves upwardly within the bore, the peg 28 received within the aperture 36 permits the sleeve 30 to move upwardly relative to the main stem 20, 20A and fully retracting the locking pin from between the cams 64. With the locking pin 26 fully retracted, the barbs 50, 52 pivot about the pivot pin 58 from the locked position to the unlocked position as shown in FIGS. 3, 6 and 9 due to the weight of the fish acting on the barbs. With the barbs in the unlocked position, the fish simply slides off the end of the arrow over the fish point 16.

To move the barbs back to the shooting position, the bowfisherman simply forces the barbs rearwardly with the fingers of his bowhand without needing to set down the bow. With the barbs in the shooting position, the bowfisherman is ready to shoot another fish.

Various embodiments of the invention have been described above for purposes of illustrating the details thereof and to enable one of ordinary skill in the art to make and use the invention. The details and features of the disclosed embodiments are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A bowfishing arrow comprising:
a shaft having a main stem with a distal end and a proximal end;
a locking pin slidably movable within a bore of the main stem;
a fish point secured to the distal end of the main stem, the fish point having a pair of barbs pivotable between a shooting position in which the barbs are disposed adjacent the main shaft in a direction toward the proximal end, a locked position in which the barbs extend laterally outwardly with respect to the main stem, and an unlocked position in which the barbs are disposed adjacent the main shaft in a reversed direction toward the distal end, each barb having a lobe with a cam;
an outer sleeve longitudinally movable with respect to the main stem and wherein the locking pin is engaged with the outer sleeve to move with the outer sleeve;
whereby, when in the locked position, an end of the locking pin is clamped between the cams preventing the barbs from pivoting toward the unlocked position and the shooting position.

2. The bowfishing arrow of claim 1, wherein the main stem is a solid shaft.

3. The bowfishing arrow of claim 1, wherein the main stem is a hollow shaft.

4. The bowfishing arrow of claim 1, wherein the locking pin is spring biased relative to the cams.

5. A method of bowfishing, comprising:
with an arrow having:
a shaft with a main stem;
a locking pin slidably movable within a bore of the main stem;
a fish point secured to a distal end of the main stem, the fish point having a pair of barbs pivotable between a shooting position in which the barbs are disposed adjacent the main shaft in a direction toward a proximal end, a locked position in which the barbs extend laterally outwardly with respect to the main stem, and an unlocked position in which the barbs are disposed adjacent the main shaft in a reversed direction toward the distal end, each barb having a lobe with a cam;
an outer sleeve longitudinally movable with respect to the main stem and wherein the locking pin is engaged with the outer sleeve to move with the outer sleeve;
shooting the arrow at a fish with the barbs in the shooting position such that the fish point penetrates the fish;
after the fish is shot with the arrow, pulling on a string tethered to the arrow, wherein pulling on the string causes the barbs to engage the fish, forcing the barbs to move from the shooting position to the locked position wherein an end of the locking pin is clamped between the cams preventing the barbs from pivoting toward the unlocked position and the shooting position until the fish is landed;
after the fish is landed, grasping only the outer sleeve of the arrow with a single hand to lift the arrow together with the fish held by the barbs in the locked position;
while grasping only the outer sleeve of the arrow, exerting a downward thrust followed immediately by an upward thrust;
whereby the downward and upward thrust causes the cams to release the end of the locking pin permitting the outer sleeve and locking pin to move together longitudinally with respect to the main stem toward the proximal end of the main stem sufficient to disengage the locking pin from the cams such that the barbs pivot to the unlocked position and the fish slides off the distal end of the arrow over the fish point.

6. The method of claim 5, wherein the main stem is a solid shaft.

7. The method of claim 5, wherein the main stem is a hollow shaft.

8. The method of claim 5, wherein the locking pin is spring biased relative to the cams.

* * * * *